April 10, 1962 J. M. HAGGARD ET AL 3,028,838
AUTOMATIC ANIMAL FEEDER
Filed Sept. 24, 1958
2 Sheets-Sheet 1
FIG. 1
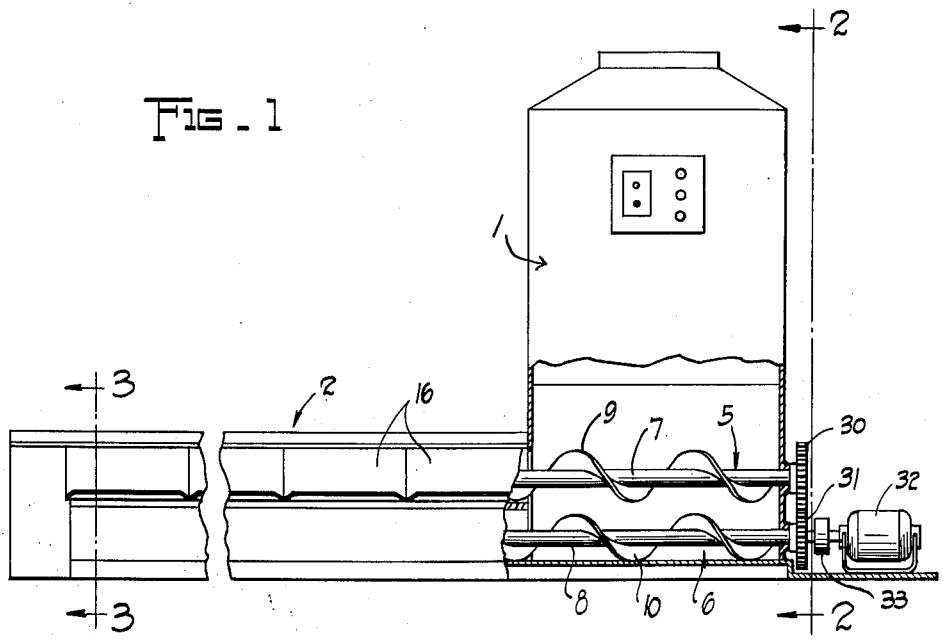
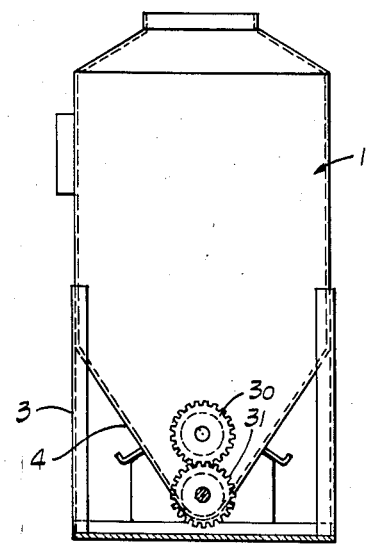
FIG. 2
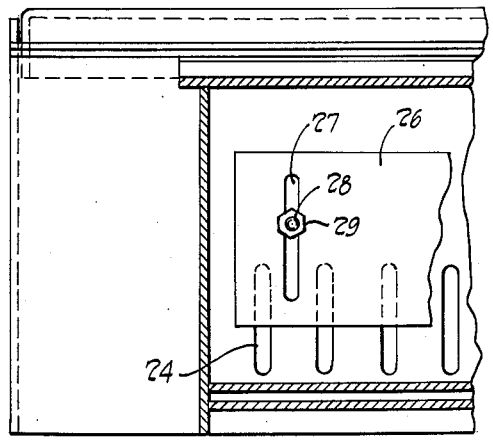
FIG. 4
INVENTORS
J. M. HAGGARD
and
BY P. A. McMURRAY
Robb & Robb
attorneys April 10, 1962  J. M. HAGGARD ET AL  3,028,838
AUTOMATIC ANIMAL FEEDER
Filed Sept. 24, 1958  2 Sheets-Sheet 2

INVENTORS
J. M. HAGGARD
and
BY P. A. McMURRAY
Robb & Robb
attorneys

United States Patent Office

3,028,838
Patented Apr. 10, 1962

3,028,838
AUTOMATIC ANIMAL FEEDER
John Marcus Haggard and Paul A. McMurray, Delphi, Ind., assignors, by mesne assignments, to A. O. Smith Harvestore Products, Inc., Kankakee, Ill., a corporation of Delaware
Filed Sept. 24, 1958, Ser. No. 763,068
4 Claims. (Cl. 119—52)

This invention relates to feeding means and particularly such means as are especially suitable for hog feeding. The means and mechanisms hereof, however, are equally adapted for feeding other types of livestock and therefore the same is contemplated hereby.

The invention hereof is particularly advantageous in that where a constant supply of feed is desirably provided, novel means for supply and controls are possible to be used if feed, which is not required at any given place for consumption by animals, there being sufficient available at the time, is returned to the main storage or supply source, substantially less feed is wasted or spoiled.

It is therefore a principal object of this invention to provide mechanical feeding means for hogs or the like which constantly provides an adequate supply of feed thereto and returns excess feed to supply source.

Another object of the invention is to supply the feed as stated and recirculate excess feed by return to its original supply source, thereafter combine such excess with an additional quantity of feed to maintain the constant sufficient supply to the animals which has been found particularly effective in promoting growth thereof.

Yet another object of this invention is to provide a novel arrangement to supply feed constantly through a trough or the like to which animals have access, the feed being furnished at a plurality of locations simultaneously, the excess supply not required at the locations being returned to the source.

A still further object of the invention is to provide a novel arrangement of conveying devices which move feed from a supply bin, deliver it through adjustable openings in a conduit, the excess feed not deposited in the trough being returned through a conveying device generally coextensive with that first described.

Another object of this invention is to provide a novel arrangement for feeding pigs or other livestock which includes a feed supply bin to which is connected a supply conduit having a screw conveyor therein operating to move feed from the bin, the conduit is provided with a series of openings through which the feed is delivered to a trough, the openings being adjustable, and a return conduit is arranged above the supply conduit to receive feed from the latter and return it to the supply bin, there being a screw conveyor in the return conduit for that purpose.

Other and further objects of the invention will be understood from a consideration of the specification appended hereto and shown in the drawings wherein:

FIGURE 1 is a view in elevation and partly in section showing the general arrangement of the parts of the invention hereof.

FIGURE 2 is an end view taken about on the line 2—2 of FIGURE 1 looking in the direction of the arrows.

FIGURE 4 is a fragmentary sectional view taken about on the line 4—4 of FIGURE 3 looking in the direction of the arrows.

Figure 3:
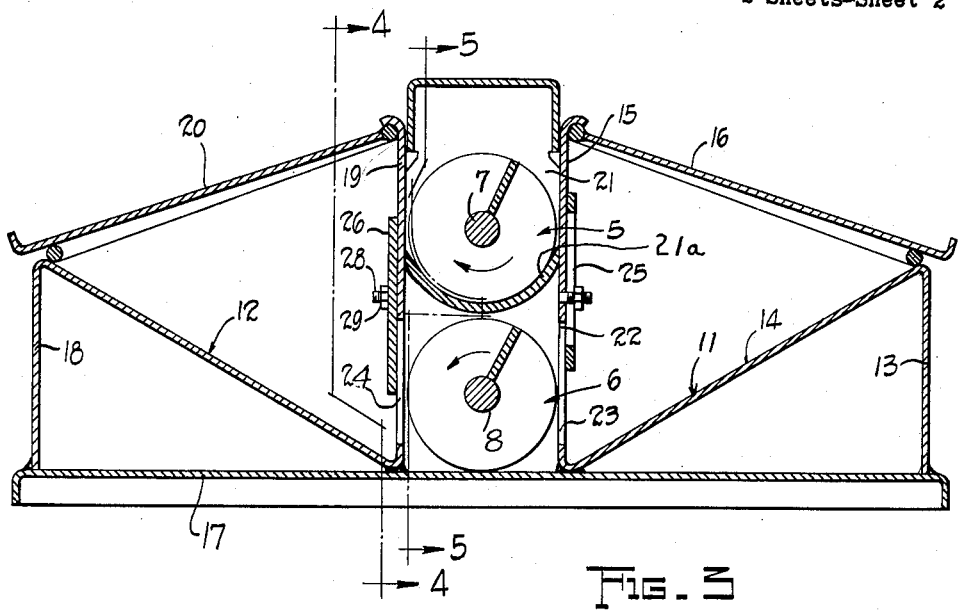
FIGURE 3 is a transverse section of the device taken about on the line 3—3 of FIGURE 1 looking in the direction of the arrows.

Referring now to the drawings, FIGURE 1 discloses the general arrangement of the major elements hereof including a supply bin generally designated 1 and the feed trough and conveying unit generally designated 2.

The supply bin 1 as indicated in FIGURE 2 is a substantially rectilinear unit, supported by the legs such as 3 having a converging delivery portion 4 at the bottom of which is supported the pair of screw conveyor units designated 5 and 6, the units being substantially identical and including a drive shaft for the member 5 denoted 7 and one for the member 6 denoted 8 with screw flights 9 and 10 respectively provided.

The screw conveyor units 5 and 6 extend from the bottom of the supply bin 1 longitudinally along the trough unit 2, the trough unit 2 as indicated in FIGURE 3 being comprised essentially of two separate troughs designated 11 and 12, which troughs are comprised of upright sections 13 a downwardly inclined portion 14 and a vertically extending side 15. At the upper end of the side 15 is hingeably mounted covers 16, there being a series of these covers as indicated in FIGURE 1 which are adapted to be raised by the animal to obtain feed which is deposited in the trough in a manner which will be subsequently explained.

There is of course a base member 17 extending beneath the troughs 11 and 12, the trough 12 being similarly formed as the trough 11 including an upright outside member 18 and upright inner member 19 at the upper end of which member 19 is hingeably mounted covers such as 20.

As will be readily understood from further consideration of FIGURE 3, the conveyor units 5 and 6 which in this case will be designated the return and supply conveyor units respectively, include conduit sections 21 and 22 respectively, the conduit section 22 being arranged so as to extend longitudinally between the troughs 11 and 12 as is likewise true of the return conduit 21 thereabove. The bottom of the upper conduit is formed of an arcuate member 21a suitably fastened to the walls 15 and 19. As will be readily understood these conduits 21 and 22 are substantially coextensive, the conduit 22 being designated the supply conduit and the conduit 21 being designated the return conduit.

As the means for providing or supplying the feed to the respective troughs 11 and 12, the sides of the conduit 22 are equipped with slots such as indicated in FIGURE 4, the slots extending vertically and being designated 23, there being of course a series of these slots extending along the upright side 15, and a corresponding series of slots 24 being those specifically illustrated in FIGURE 4 being provided on the upright wall 19 of the trough 12.

As has been found desirable the opening or exposure of the slot area is desirably modified in accordance with the demands of animals feeding at the trough, and for this purpose suitable gates or plate closure members 25 and 26 are provided, the members 26 and 25 being substantially identical and reference being had at this point to FIGURE 4 for further illustration of the member 26.

The member 26 is shown as being provided with a slot such as 27 therein, there being a series of these slots as necessary throughout the length of the member 26 through which a stud such as 28 extends and a nut 29 is provided to secure the plate 26 in adjusted position. Other nuts and studs 28 and 29 are provided throughout the length of the plate 26 to fix the same in adjusted position and regulate the amount of feed supplied from the conduit 22 into the trough 12. The trough 11 is likewise supplied.

The conveyor devices 5 and 6 previously mentioned, are provided with the described flights 9 and 10 thereon which flights are of the same hand and at the end of the shafts 7 and 8 respectively as indicated in FIGURE 1 gears such as 30 and 31 are provided, the gears meshing as illustrated. Thus when the operation of one of the gears is effected as by rotation of the shaft 8 upon which the same is mounted, this being the gear 31 for example the rotation of the gear 30 will be in the opposite direction and thus the conveyor 5 connected thereto will likewise be similarly rotated. For the purpose of rotating the conveyors a suitable motor such as 32 is provided coupled by a coupling 33 to the shaft 8.

As the shaft 8 is rotated, and the flight 10 thereon, feed will be carried from the bin, since the conveyor 6 operates in the bottom of the bin and the feed is supplied through the upper part thereof and maintained in constant supply therein, feed moving to the left as viewed in FIGURE 1 and being distributed through the slots 23 and 24 into the troughs 11 and 12 in accordance with the location of the plates 25 and 26, which regulate the quantity delivered to the respective troughs.

Figure 5:
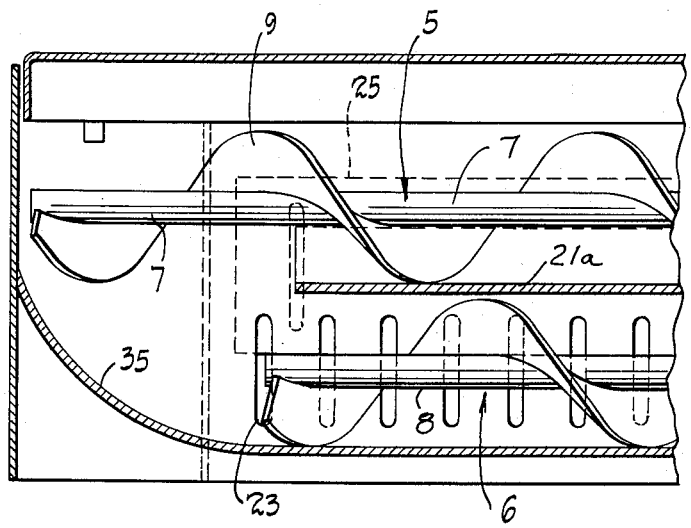
FIGURE 5 is a similar fragmentary sectional view taken about on the line 5—5 of FIGURE 3 looking in the direction of the arrows.

As the feed moves along as carried by the conveyor 6, it reaches the end as illustrated in FIGURE 5 and at that point the bottom of the conduit 22 is curved upwardly as indicated at 35 so that the feed is forced thereupon. As the feed builds up on this curved portion 35, the conveyor 5 picks the same up by the flights 9 as operated by the shaft 7, and carries the feed back to the right as viewed in FIGURE 5 and thus back to the interior of the supply bin 1. There is thus a constant movement of feed and the feed that is not delivered through the openings 23 and 24 is carried back to the bin 1 by the return conveyor unit where it is mixed with feed in the bin and of course is eventually again carried toward the left as viewed in FIGURE 1 by the lower screw conveyor unit 6 for subsequent delivery eventually through the slots such as 23 and 24.

There is thus a continual circulation of feed and any spoilage of feed is prevented and wastage is obviated because only enough feed is delivered to the respective troughs 11 and 12 as is required in accordance with the adjustment of the openings 23 and 24.

Of course suitable controls for the drive motor 32 may be provided for timing the operation of the device and there is no need to provide agitation in the bin 1 since the pair of conveyors operating therewithin effectively keep the feed in condition for movement by the supply conveyor as described in a circulatory manner.

We claim:

1. An animal feeder, comprising a supply bin, a supply conduit connected to the bin and extending therefrom, said supply conduit having a plurality of spaced, vertically elongated openings therein, a plurality of vertically movable plates on the supply conduit, said plates being in throttling relation with the vertically elongated openings for adjusting the size of the openings in said supply conduit, a supply conveyor located in said supply conduit and extending within the bottom of the bin to convey feed from the bin and through the conduit for deposit of the feed through said openings, a return conduit having an inner opening communicating with the bin above the supply conduit, said return conduit also having a second opening communicating with the supply conduit, a return conveyor disposed in the return conduit and extending into the bin above said supply conduit, a feed transfer means at the end of the supply conduit to transfer feed not deposited through said elongated openings to the return conduit through the opening between the conduits to return feed to the bin by means of the return conveyor in the return conduit, and means to drive the supply and return conveyors for constant circulation of feed in the supply and return conduits from and to the bin.

2. The apparatus of claim 1 in which the return conduit opens into the central portion of the feed bin above the supply conduit whereby excess feed returned to the bin will be immediately recirculated before unmixed bin feed only is circulated through the supply conduit to prevent feed spoilage.

3. The apparatus of claim 1 in which the spaced, vertically elongated openings are disposed on both sides of the supply conduit to supply a plurality of separate feed troughs, and the openings into each feed trough may be separately throttled.

4. The apparatus of claim 1 in which the supply and return conveyors are rotatable screw type conveyor augers and the feed transfer means at the end of the supply conduit comprises a curved diverter plate which diverts excess feed into the return conduit.

References Cited in the file of this patent

UNITED STATES PATENTS

| | | |
|---|---|---|
| 1,563,206 | Longenecker | Nov. 24, 1925 |
| 2,222,369 | McLeod | Nov. 19, 1940 |
| 2,522,449 | Innman | Sept. 12, 1950 |
| 2,563,321 | Dugan | Aug. 7, 1951 |
| 2,630,906 | Phillipp | Mar. 10, 1953 |
| 2,782,761 | Martin et al. | Feb. 26, 1957 |
| 2,801,610 | Wallace et al. | Aug. 6, 1957 |
| 2,854,949 | Wiggins | Oct. 7, 1958 |
| 2,867,314 | Hansen | Jan. 6, 1959 |
| 2,914,024 | Hobbs | Nov. 24, 1959 |
| 2,926,629 | Hazen | Mar. 1, 1960 |